United States Patent Office 3,529,627
Patented Sept. 22, 1970

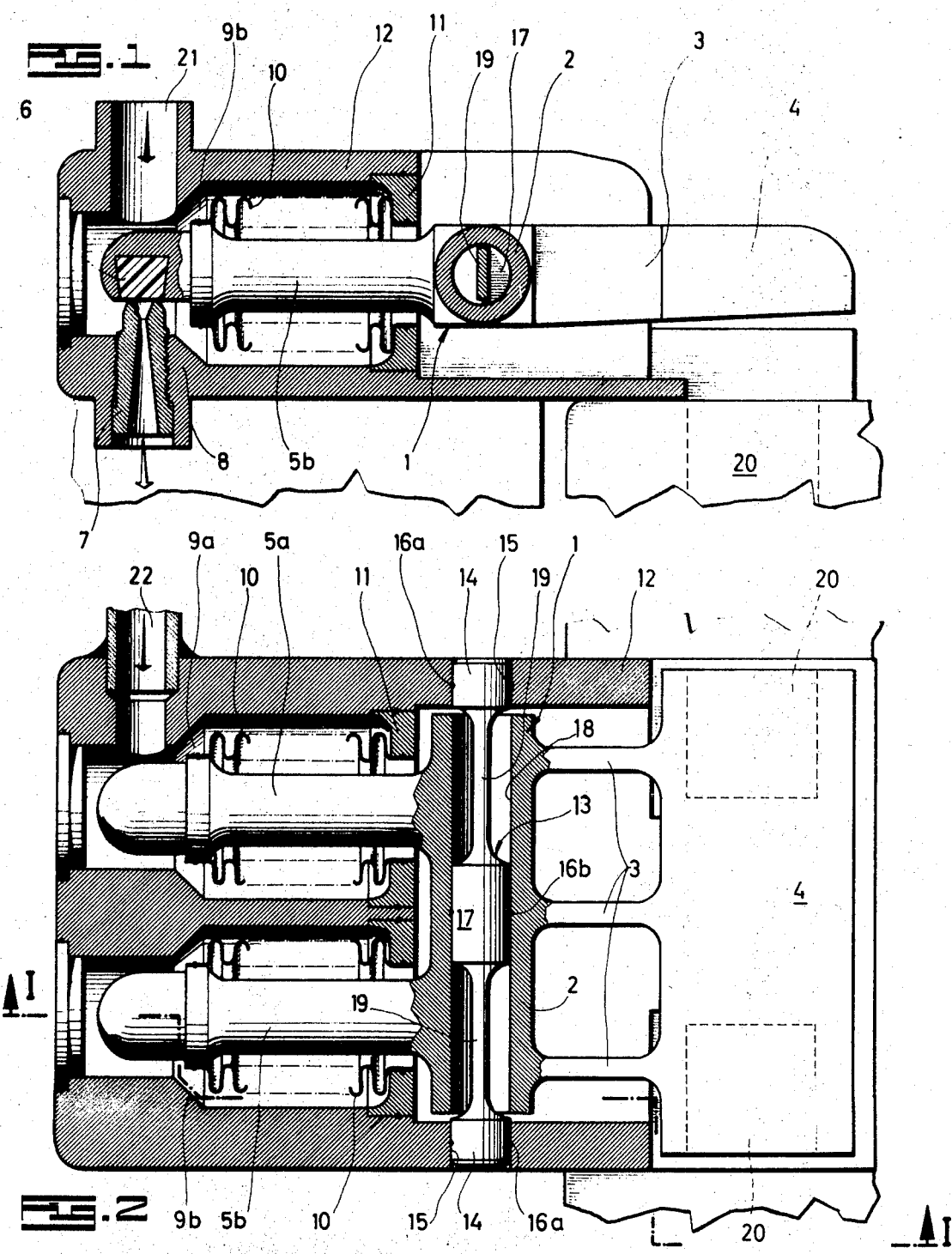

3,529,627
VALVE LEVER ARRANGEMENT FOR ROCKET ENGINES
Helmut Fränkle, Konigsbach, and Manfred Biebricher, Erlenbach, Germany, assignors to Bolkow Gesellschaft mit beschrankter Haftung, Munich, Germany
Filed June 4, 1968, Ser. No. 734,352
Claims priority, application Germany, June 6, 1967, B 92,879
Int. Cl. F16k 31/04, 11/16
U.S. Cl. 137—595      5 Claims

ABSTRACT OF THE DISCLOSURE

A value lever arrangement for a rocket engine is comprised of a valve lever mounted within an engine housing. A torsion bar is integrally secured at its opposite ends to the engine housing and passes through a bore formed in the valve lever. A center portion of the torsion bar is integrally secured to the valve lever within the bore. Positioned between the ends of the torsion bar and its center portion are torsion sections of rectangular cross section shaped to prevent any surface contact between the torsion section and the surface of the valve lever within the bore. The torsion bar provides a spring action for returning the valve lever to the closed position within the engine housing.

SUMMARY OF THE INVENTION

The present invention is directed to a valve lever arrangement for a rocket engine and, more particularly, it is concerned with a valve lever pivotally mounted on a torsion bar which is arranged to urge the valve lever into its closed position.

It has been known in rocket engines, as disclosed in U.S. Pat. No. 3,245,217, in particular see FIG. 2, to pivotally mount a valve flap in the rocket engine housing which serves as a closure for the thrust nozzle. The valve flap is designed as a double arm lever with its operating arm engaged by a drive means. The drive means consists of a cylindrical housing with a closure spring mounted therein, a magnet coil with a moving core, and an operating bar whose outer end is articulated on the operating lever of the valve flap. By means of a solenoid the valve flap is moved into the opened position, and the thrust nozzle valve is closed by means of the spring. However, thus known valve arrangement has certain disadvantages, for instance, the closure spring, designed as a helical spring, requires a certain mounting length, and, further, bearings in any form such as the pivot bearing of the valve flap are a source of trouble, since, due to friction, welding may take place between the bearing surfaces in the vacuum existing under outer space conditions. To avoid these problems it is necessary to enclose all the bearings in a pressure-tight housing, however, this is a rather complicated and expensive procedure and frequently is not possible, or if so, only under considerable difficulty.

Accordingly, the primary object of the invention is to provide a valve lever arrangement for a rocket engine which is simple in design, avoids the disadvantages of previous valve lever arrangements, and operates safely under outer space conditions.

Another object of the invention is to provide a torsion bar as the spring means for displacing the valve lever into its closed position.

Still another object of the invention is to shape the torison bar so that its torsion sections are spaced from the enclosing section of the valve lever to avoid any frictional contact between the opposing surfaces thereof which might result in their being welded together.

Moreover, another object of the invention is to provide a torsion bar with continuous smooth cylindrical surfaces in contract with similarly shaped bores or openings in the valve lever and engine housing and with rectangularly shaped torsion sections positioned between these cylindrical surfaces of the torsion bar.

A still further object of the invention is to integrally secure the torsion bar to the engine housing and to the valve lever by means of electron ray spot welding.

Yet another object of the invention is to provide a valve lever arrangement which is simple to fabricate, easy to assemble, and one which operates effectively and safely under outer space conditions.

The basic characteristic of the present invention is the use of a torsion bar for mounting the valve lever within an engine housing. At its ends the torsion bar is securely fixed to the engine housing and in its center region it is securely fixed to the valve lever. Between the sections of the torsion bar which are secured to the engine housing and to the valve lever torsion sections are provided with a configuration which avoids any metallic contact between the torsion sections of the bar and the opposite surfaces of the valve lever and engine housing. Due to the arrangement of the torsion bar the invention provides an extremely safe arrangement for valve levers used in rocket engines operating under outer space conditions, and especially the possibility of welding occurring in outer space is avoided. Moreover, the valve lever construction embodied in the present invention is simple in its overall arrangement, and also it is compact and light weight since the valve closing means and the valve lever bearing axes form a single unit.

To provide simple assembly conditions the two ends and the central section of the torsion bar are provided with smooth continuous cylindrical surfaces all having the same diameter, and these surfaces are fitted tightly into similarly shaped smooth bores in the engine housing, and in the hub of the valve lever. Additionally, the torsion bar is integrally secured within each of these bores or openings by means of electron ray spot welding.

In order to attain a greater spring force, particularly one having a progressive spring characteristic, the torsion sections of the torsion bar between the points where it is securely attached to the engine housing and the valve lever are rectangular in cross section and are arranged in spaced relationship with the opposed surfaces of the bore in the hub of the valve lever.

While it has been known to mount valve levers on torsion bars used in piston engines, as disclosed in German Pat. No. 593,528, however, in such arrangements the torsion section of the bars have one end in bearing engagement within the pivot bearings whereby friction surfaces are established which would be unsafe under the circumstances in which the present invention is employed.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

In the drawings:

FIG. 1 is a top view, partly in section, of a rocket engine embodying the valve lever arrangement of the present invention; and FIG. 2 is a view partly in section, taken along line II—II in FIG. 1.

DETAILED DESCRIPTION OF THE INVENTION

As shown in FIG. 1 a valve lever 1 for use in a rocket engine is positioned in an engine housing 12 and is arranged as a double-lever formed of a central bearing hub or lug 2 secured on one side by three spaced operating arm straps 3 to an operating plate 4. Secured to and extending from the opposite side of the hub 2 is a pair of laterally spaced valve arms 5a, 5b. Inserted in the front ends of the valve arms 5a and 5b, that is the ends spaced remotely from the hub 2 are seal means 6, formed of a suitable material, which cooperates with valve seats 7 mounted in the engine housing 12. The valve seats 7 are located in inlets 8 leading into feed ducts for supplying propellant components into the rocket engine combustion chamber, not shown.

The engine housing 12 forms a pair of separate valve chambers 9a, 9b. The chambers 9a, 9b open into the portion of the housing containing the hub 2, however, flexible metal bellows 10 are secured to each of the valve arms near their front ends and are secured toward the rear of the valve arms to a terminal wall 11 located adjacent the hub of the valve lever 1. These bellows 10 seal off flow from the valve chambers.

Within the engine housing 12, the valve lever 1 is mounted in position by a symmetrically arranged torsion bar 13 which extends transversely across the housing relative to the axes of the valve arms 5a, 5b. At each of its ends the torsion bar 13 is provided with a pair of cylindrically shaped end surfaces 14 which provide a continuous smooth surface for insertion into similarly shaped bores or openings 15 in the opposite sides of the engine housing. The ends of 14 of the torsion bars 13 are integrally secured within the openings 15 in the engine housing by means of electron ray spot welding as indicated by the weld spots 16a. Positioned at the middle of the torsion bar 13 is a center surface 17 which, similar to the ends of the torsion bar, is cylindrical in shape and provides a smooth continuous surface for engagement within a similarly shaped bore 18 through the hub 2 of the valve lever. The torsion bar is integrally secured to the surface of the bore 18 by means of electron ray spot welding as exhibited by the weld spots 16b.

Located between the cylindrically shaped portions of the torsion bar 13 are two torsion sections 19 which extend through and are spaced from the opposed surfaces of the bore 18 in the hub 2 of the valve lever. As indicated in FIG. 2, these torsion sections 19 are rectangular in cross section having a greater dimension in one direction than in the other and with the greater dimension being less than the diameter of the cylindrical section of the bar. In this way the rectangularly shaped surfaces of the torsion sections 19 are spaced from the juxtaposed surfaces of the bore 18 and as a result when the valve lever is pivoted between the opened and closed positions there is no frictional engagement between the torsion sections 19 and the juxtaposed surfaces and the previously known problem of welding is avoided.

The valve lever 1 is operated electromagnetically by solenoids 20 disposed below the operating plate 4 of the lever.

In the engine housing near the front ends of the valve arms an inlet connection 21 is provided to valve chamber 9b for providing one of the propellant components, such as liquid oxygen, while an inlet 22 is provided into the other valve chamber 9a for supplying the other propellant component, that is a liquid fuel.

One of the principal features of the present invention is to shape the ends and central portion of the torsion bar as well as the opposed bearing surfaces in the engine housing and the bore through the hub of the valve lever to effect a closely fitting engagement between these parts. Additionally, it is possible to vary the cross sectional shape of the torsion section of the torsion bar in a different shape depending on the situation and conditions affecting a particular case.

What is claimed is:

1. A valve lever arrangement for a rocket engine comprising a housing having a pair of longitudinally extending side walls, a valve lever positioned within said housing and extending in the longitudinal direction of said side walls for movement between a closed position and an open position, said valve lever comprises a hub extending transversely of said side walls of said housing, and a pair of spaced valve arms secured to and extending in the longitudinal direction of said side walls from one side of said hub, said hub having a cylindrically shaped bore therethrough extending transversely of said side walls, said side walls each having a cylindrically shaped bore formed therein in alignment with the bore through said hub, a torsion bar having cylindrically shaped end sections and an intermediate cylindrically shaped section spaced from each of said end sections, said torsion bar extending through the bore in said hub and said cylindrically shaped end sections thereof being integrally secured within and in continuous surface contact with the cylindrically shaped bores in said side walls and said intermediate cylindrically shaped section of said torsion rod being integrally secured within and in continuous surface contact with the cylindrically shaped bore in said hub, said torsion bar comprising a pair of axially aligned torsion sections each extending between one of said end sections of said torsion bar and said intermediate section thereof, said torsion sections extending through the bore in said hub and having a rectangular cross-section with the sides of said rectangular cross-section being longer in one direction than in the other and the longer sides of said cross-section being less than the diameter of said bore through said hub so that as said torsion sections of said torsion bar twist between the points at which said torsion bar is integrally secured to said side walls and to said hub the peripheral surfaces of said torsion sections are spaced from the juxtaposed surfaces of the bore in said hub for avoiding frictional contact therebetween.

2. A valve lever arrangement as set forth in claim 1, wherein said valve chambers each have an outlet therefrom, a valve seat disposed in each of said outlets, and seal means disposed in the ends of said valve arms remote from said hub for forming closure means in combination with said valve seats for said outlets.

3. A valve lever arrangement as set forth in claim 2, wherein a flexible metal bellows is secured to each of said valve arms at a location remote from said hub, a terminal wall in each of said chambers adjacent said hub, and the opposite ends of said bellows secured to said terminal walls and forming a seal for said valve chambers.

4. A valve lever arrangement, as set forth in claim 1, wherein said housing comprises said side walls, end walls and partition means for forming a pair of valve chambers within said housing, each of said valve arms of said lever extending from said hub into one of said valve chambers, a plate member disposed on and spaced from the opposite side of said hub from said valve arms, and laterally spaced connector members secured to said hub and extending therefrom and secured to said plate member.

5. A valve lever arrangement as set forth in claim 4, wherein solenoids are disposed in said engine housing in the region of said plate members for electromagnetically displacing said valve levers into the opened position through said plate member.

References Cited
UNITED STATES PATENTS

| | | | |
|---|---|---|---|
| 2,977,985 | 4/1961 | Ericson et al. | 137—625.61 |
| 3,117,585 | 1/1964 | Gerwig et al. | 137—625.61 |
| 3,373,769 | 3/1968 | Chaves et al. | 137—595 |

HENRY T. KLINKSIEK, Primary Examiner

U.S. Cl. X.R.

251—335